US009384413B2

(12) United States Patent
John et al.

(10) Patent No.: US 9,384,413 B2
(45) Date of Patent: Jul. 5, 2016

(54) METHOD AND DEVICE FOR AUTOMATIC OR SEMI-AUTOMATIC SEGMENTATION OF A 3D IMAGE DATA SET

(71) Applicant: Siemens Aktiengesellschaft, Munich (DE)

(72) Inventors: Matthias John, Nuremberg (DE); Norbert Rahn, Forchheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/484,622

(22) Filed: Sep. 12, 2014

(65) Prior Publication Data

US 2015/0078643 A1    Mar. 19, 2015

(30) Foreign Application Priority Data

Sep. 13, 2013  (DE) .......................... 10 2013 218 437

(51) Int. Cl.
*G06K 9/00* (2006.01)
*G06K 9/46* (2006.01)
*G06T 7/00* (2006.01)

(52) U.S. Cl.
CPC ................ *G06K 9/46* (2013.01); *G06T 7/0012* (2013.01); *G06T 7/0081* (2013.01); *G06T 7/0083* (2013.01); *G06T 7/0089* (2013.01); *G06K 2009/4666* (2013.01); *G06T 2207/10081* (2013.01); *G06T 2207/10088* (2013.01); *G06T 2207/10116* (2013.01); *G06T 2207/30004* (2013.01)

(58) Field of Classification Search
None
See application file for complete search history.

(56) References Cited

U.S. PATENT DOCUMENTS

| 2006/0257013 | A1* | 11/2006 | Ramm ............... G01N 15/1475 382/133 |
| 2012/0230570 | A1 | 9/2012 | Zheng et al. |
| 2013/0121549 | A1* | 5/2013 | Pekar ................... G06T 7/0012 382/128 |

OTHER PUBLICATIONS

Freedman et al., "Interactive Graph Cut Based Segmentation with Shape Priors," Computer Vision and Pattern Recognition, 2005, CVPR 2005, IEEE Computer Society Conference on San Diego, CA, USA Jun. 20-26, 2005, Piscataway, NJ, IEEE, vol. 1, pp. 755-762 (2005).
Syngo X Workplace / Intelligent Postprocessing for X-ray Systems—Data sheet, Siemens AG (2008).
Boykov et al., "Interactive Graph Cuts for Optimal Boundary & Region Segmentation of Objects in N-D Images," Proceedings of International Conference on Computer Vision, Jul. 2001, vol. 1, pp. 105-112 (2001).

(Continued)

*Primary Examiner* — Stephen R Koziol
*Assistant Examiner* — Amandeep Saini
(74) *Attorney, Agent, or Firm* — Schiff Hardin LLP

(57) ABSTRACT

In a method and apparatus for automatic or semi-automatic segmentation of a 3D image data set, acquired by a medical imaging apparatus, of an examination region that includes an organ, the 3D image data set is provided to a computer/processor, which is also provided with information with designating the type of organ imaged in the examination region. The 3D image data set is automatically segmented in the computer/processor using a model-based segmentation algorithm, wherein the designated type of organ is used as a basis of the model. The 3D data set is also automatically or semi-automatically segmented using a greyscale value-based segmentation algorithm. At least one of the segmentation results is displayed.

11 Claims, 1 Drawing Sheet

(56) References Cited

OTHER PUBLICATIONS

Koninklijke Philips Electronics N.V., EP navigator, Data Sheet (2004).

Siemens Ag; Medical Solutions; Angiography and Interventional X-Ray Artis zee EP Suite / Making your EP lab a better place to work, Siemens AG (2012).

Zheng et al., "Multi-part Left Atrium Modeling and Segmentation in C-Arm CT Volumes for Atrial Fibrillation Ablation"; Medical Image Computing and Computer-Assisted Intervention—(2011), pp. 487-495.

Yang et al.; "Graph Cuts Based Left Atrium Segmentation Refinement and Right Middle Pulmonary Vein Extraction in C-Arm CT"; Medical Imaging 2013: Image Processing, Proc. of SPIE; vol. 8669; pp. 86693U1-86693U9; (2013).

* cited by examiner

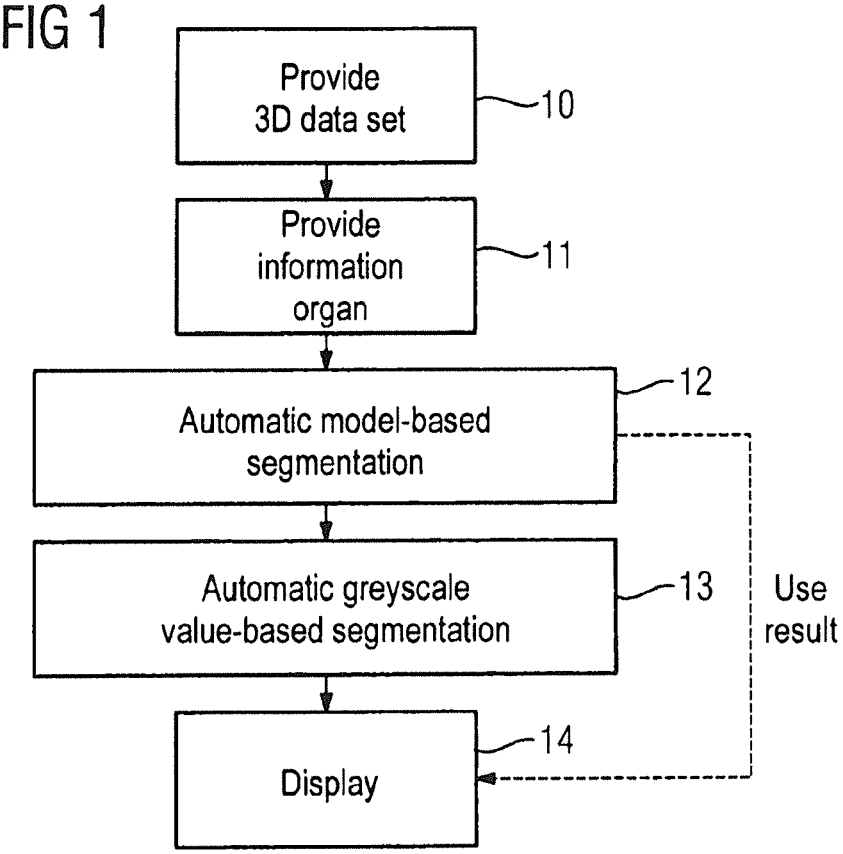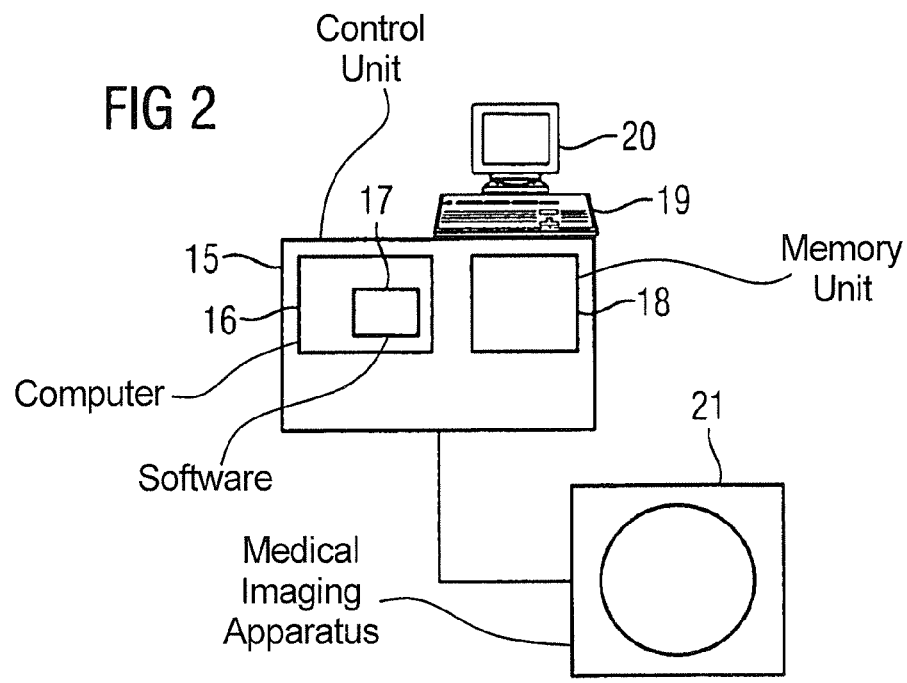

METHOD AND DEVICE FOR AUTOMATIC OR SEMI-AUTOMATIC SEGMENTATION OF A 3D IMAGE DATA SET

BACKGROUND OF THE INVENTION

1. Field of the Invention

The invention concerns a method for automatic or semi-automatic segmentation of a 3D image data set, acquired by a medical imaging apparatus, and a device to implement such a method.

2. Description of the Prior Art

Segmentations of image data sets from medical imaging apparatuses are not reliable for additional image processing nor for a better detection capability and diagnosis. A segmentation (for example of the left atrium of a human heart) from three-dimensional CT, MR or rotation angiography image data is important for planning and implementation of medical procedures and ablation procedures, since the left atrium of the heart has a high individual variability. Currently, model-based or greyscale value-based segmentation algorithms are used; both types have advantages and disadvantages. The model-based segmentation can be implemented quickly, automatically at the press of a button, and is able to function even given image data with reduced image quality and/or reduced contrast, but is also often very imprecise. In contrast to this, a greyscale value-based segmentation algorithm is very precise given good image quality, but is slow and error-prone given reduced image quality and/or reduced contrast of the image data set, and it often requires a large number of user inputs.

Both model-based and greyscale value-based algorithms are commercially available. For example, in x-ray apparatuses for image processing, Philips Healthcare uses a model-based segmentation algorithm for segmentation of the left atrium ("EP Navigator" product). In angiography x-ray apparatuses, Siemens Healthcare uses a semi-automatic greyscale value-based segmentation, known as "1-click segmentation," for image processing ("InSpace EP" product). In this product, in the ideal case the user only needs to mark an image point in the center of the left atrium, and the segmentation is subsequently implemented automatically.

SUMMARY OF THE INVENTION

An object of the present invention to provide a method for segmentation of a 3D image data set acquired by a medical imaging apparatus, which avoids the disadvantages of the prior art and offers the possibility of a fully automatic segmentation. It is furthermore an object of the invention to provide a device suitable for the implementation of such a method.

The method according to the invention for automatic or semi-automatic segmentation of a 3D image data set (acquired by a medical imaging apparatus) of an examination region including an organ has the following steps.

The 3D image data set is provided to a computerized processor. Information designating the type of organ imaged in the examination region is entered into the processor. In the processor, the 3D image data set is automatically segmented using a model-based segmentation algorithm, with the type of organ that was entered being used as a basis of the model. The 3D image data set is automatically or semi-automatically segmented using a greyscale value-based segmentation algorithm. At least one of the segmentation results is displayed.

A device according to the invention has a control device to control the method, a computer with a computer-implemented software to implement the segmentations, a memory unit to store 3D image data and segmentation results, an input unit to receive user inputs, and a display unit to display segmented 3D image data. The control device and the computer are configured to implement the method according to the invention.

The 3D image data set can be acquired by a medical imaging apparatus immediately before being provided to the computer/processor, or can already be acquired and stored beforehand. In the latter case, the 3D data set is retrieved from the memory unit and is provided to the computer for execution of the method. The information with regard to the type of organ imaged in the examination region can likewise be provided in various ways. The information can likewise be retrieved from a memory unit, or can be retrieved from the organ program used to acquire the 3D data set. For example, an automatic organ detection can also be implemented by a software.

The model-based segmentation algorithm is implemented automatically using the information regarding the organ. For example, using the information that the organ is the left atrium, a model of one or more left atria is used as a basis of the segmentation algorithm. Model-based segmentations are known. For example, such a method is described in U.S. Patent Application Publication No. 2012/0230570 A1.

Greyscale value-based segmentation algorithms are likewise known from the prior art. Here the segmentation is based on an individual consideration of every single voxel of the 3D image data set. Such segmentations require at least one user input, for example in that a user marks an image point or region of the 3D data set as belonging to the organ or a partial organ of the organ, or to a background. Within the scope of the semi-automatic segmentation—known as the "1-click" segmentation—of the left atrium of the human heart from Siemens AG, a user marks the center of the left atrium once in a slice image (MPR), for example, whereupon the segmentation method is implemented automatically. Greyscale value-based segmentation algorithms can be based on an edge detection and/or a threshold detection, for example. For example, a greyscale value-based segmentation algorithm is known from the article *Interactive Graph Cuts for Optimal Boundary and Region Segmentation of Objects in N-D Images*, Proceedings of "International Conference on Computer Vision", Vancouver, Canada, July 2001, Vol. I, Pages 105 ff.

At least one segmentation result (or both segmentation results) is displayed. For example, the display of the segmentation result of the model-based segmentation algorithm can already occur after the conclusion of this segmentation and before the conclusion (possibly even before the beginning) of the segmentation with the greyscale value-based segmentation algorithm.

The method according to the invention enables a fast provision of segmentation results by the automatic implementation of the model-based segmentation algorithm on the basis of the information regarding the imaged organ, and more precise segmentation results of a higher quality can be delivered later by the additional implementation of the greyscale value-based segmentation algorithm, and can be used for review. The invention combines the advantages of both segmentation types and eliminates the disadvantages because it provides segmentation results both quickly and precisely, and at high quality. According to an embodiment of the invention, the segmentation results obtained by the model-based segmentation algorithm are compared with the segmentation results obtained by the greyscale value-based segmentation algorithm, which enables a selection of the optimal segmentation results.

For a flexible implementation of the method, the sequence of the segmentations can be modified by receiving a user input. For example, a user can decide before the beginning of the method which segmentation is implemented first.

According to a further embodiment of the invention, user inputs with regard to image points (in particular with regard to an association with the organ or a partial organ of the organ) are received and used for semi-automatic segmentation by means of the greyscale value-based segmentation algorithm. For example, a user can mark the middle point of the imaged organ or of a partial organ of the organ, and/or additionally mark the one image point of the background, in order to improve the precision of the result of the segmentation algorithm.

According to a further embodiment of the invention, the segmentation by the model-based segmentation is implemented first, and at least one segmentation result of this segmentation is used as a basis for implementation of the greyscale value-based segmentation algorithm. In this way it is possible to implement the method wholly automatically without additional action by a user. For example, information from the segmentation result of the model-based segmentation algorithm can be used, which replaces an otherwise necessary manual marking by a user.

For example, at least one image point, which was determined by the segmentation by the model-based segmentation algorithm as being associated with the organ or a partial organ of the organ, can be used for the segmentation by the greyscale value-based segmentation algorithm, as if it is associated with the organ or a partial organ of the organ. For example, in the case of the left atrium of a human heart, the center of the left atrium can be removed from the segmentation result of the model-based segmentation algorithm, and the greyscale value-based segmentation algorithm can be implemented on this basis.

Following the segmentations, at least one user input with regard to an association of image points with the organ or a partial organ of the organ is received for an improvement of the segmentation results, and is used for correction of the segmentation results. The segmentation result can be modified as needed in individual slice images (MPRs) of the 3D data set, for example via manipulation of contours or by drawing lines in the slice images.

According to a further embodiment of the invention, the 3D image data set is formed by a magnetic resonance tomography data set, a computed tomography data set or an angiography data set.

BRIEF DESCRIPTION OF THE DRAWINGS

FIG. 1 shows a sequence of an embodiment of the method according to the invention.
FIG. 2 schematically illustrates a device according to the invention for implementation of the method.

DESCRIPTION OF THE PREFERRED EMBODIMENTS

A sequence of the automatic method according to the invention, with two successively running segmentations on the basis of different segmentation algorithms, is shown in FIG. 1. The method can be implemented by a device shown in FIG. 2, wherein a control unit 15 adopts the control of the method. In a first step 10, a 3D image data set of an examination region is initially provided, the 3D image data set including a depiction of an organ. An organ in this context means a contiguous region of only a portion of the human body, for example hand, foot, brain, heart, left atrium of the heart, aortic root etc. The 3D image data set has been acquired by a medical imaging apparatus, for example a magnetic resonance tomography apparatus, a computed tomography apparatus, or an x-ray apparatus. The acquisition, and possibly a reconstruction of the 3D image data set, can have been implemented immediately before being provided, or the 3D image data set can already be acquired long before and stored in a memory unit 18.

Moreover, in addition to the 3D image data set, at least one item of information about the type of organ imaged in the 3D image data set is provided in a second step 11, which can take place simultaneously with or after the first step 10. For example, this information can be retrieved from the memory unit, where it can be stored together with or separate from the 3D image data set. For example, the type of organ can be determined using an organ program by means of which the 3D image data set was acquired. However, the information can also first be determined according to the presence of the 3D image data, for example by an automatic, software-controlled organ detection being applied to the 3D image data set. Such automatic organ detection programs are known.

After the presence of the information with regard to the type of the organ (which organ is in the 3D image data set) a model-based segmentation algorithm is implemented automatically. The model or models are used on the basis of the information regarding the type of organ. For example, if it is automatically detected that the segmented organ is a left atrium of the heart, a model-based segmentation algorithm is implemented that extracts a contrasted left atrium (including an atrial auricle and incoming pulmonary vein). For example, if it is detected automatically that the organ to be segmented is an aortic root, a model-based segmentation algorithm is implemented that extracts the aortic root, an ostium of coronary arteries, and parts of an ascending aorta and, for example, marks the ostium and the valvular leaflet of the aortic valve.

In a fourth step 13, a greyscale value-based segmentation algorithm is semi-automatically or wholly automatically applied to the 3D image data set. For example, a known greyscale value-based segmentation algorithm can be used, as described in the article *Interactive Graph Cuts for Optimal Boundary and Region Segmentation of Objects in N-D Images*, Proceedings of "International Conference on Computer Vision", Vancouver, Canada, July 2001, Vol. I, Pages 105 ff. The greyscale value-based segmentation can be started simultaneously with or before the model-based segmentation, or after conclusion of the model-based segmentation. According to a preferred embodiment of the invention, it is implemented after the conclusion of the model-based segmentation, and at least one result of the model-based segmentation algorithm is used as a basis for the greyscale value-based segmentation algorithm.

In general, at least one user input with regard to a marking or selection of an image point or, respectively, voxel belonging to the organ or partial organ to be segmented is necessary to implement a greyscale value-based segmentation. In the known "1-click" segmentation (greyscale value-based), the user marks an image point in a slice image (MPRs) which forms the center of the organ (for example left atrium of the heart); the segmentation is then implemented with this input information. Within the scope of the method, information designating the center of the organ or at least one or more image points of the organ can now be automatically removed from the segmentation result of the model-based segmentation algorithm and be used as an initialization for the greyscale value-based segmentation. In this way, a wholly automatic method is possible without any input of a user.

Alternatively, the greyscale value-based segmentation algorithm can also be implemented after receiving one or more user inputs; it can also be implemented as needed before the model-based segmentation.

In a fifth step 14, a display takes place of at least one segmentation result of the segmentations, preferably of both segmentation results. For example, the display takes place at a display unit 20 (monitor etc.). The segmentation result of the model-based segmentation algorithm (if this is implemented first) is displayed immediately after its conclusion, but still before the start of the greyscale value-based segmentation. In the display, parts of the segmentation result can be marked with colors, labels, points etc.

Given the presence of two segmentation results, these can be compared with one another. For example, agreements and deviations of the results can be automatically displayed as marked. In this way, a user (thus, for example, a physician deciding about a subsequent medical procedure or further processing) can select the segmentation result that is better suited to the further use (for example for the subsequent steps of an ablation procedure, in the case of a left atrium of the heart).

According to the presence of the segmentation result or results, manual inputs can be made by a user for a correction or variation of the segmentation results. For example, the segmentation results can be modified using markings or selections of image points in the individual slice images (MPRs). For example, this can occur by manipulation of contours (that mark the segmentation result in the slice images) or by drawing lines in the slice images (which indicate which parts should be added or taken away from the segmentation result). The manipulations in the MPRs are accepted and subsequently realized automatically such that the manipulations immediately affect the three-dimensional representation of the segmentation result. Alternatively, it is possible to edit the segmentation result or results directly in a 3D image data presentation, for example by "punching out" image parts that are incorrectly included in the segmentation result.

The device shown in FIG. 2 to implement the method according to the invention has a control unit 15 to control the method and a computer 16 with a software 17. The computer, controlled by the control unit 15 and, for example by the software 17, implements all calculations and processes (for example the segmentations). Results or intermediate results are stored at the memory unit 18, or data already stored by the memory unit 18 are retrieved. A display unit 20 is provided to display 3D image data and segmentation results, and an input unit 19 (for example a keyboard or a touchscreen) is provided to input user inputs. The input unit has the function of a user interface. This can offer the activation of both segmentation algorithms (model-based, greyscale value-based) in an arbitrary order, wherein after selection of the semi-automatic greyscale value-based segmentation—in contrast to the model-based segmentation—additional user interactions can be required.

The medical imaging apparatus 21 can be, for example, a magnetic resonance tomography apparatus, a computed tomography apparatus or an x-ray apparatus (angiography x-ray apparatus, C-arm x-ray apparatus, etc.), which can acquire 3D image data sets of examination regions and perform the reconstruction as needed. The method according to the invention can take place immediately following the acquisition, or the image data can initially be stored and used later for the method.

The workflow with regard to a segmentation of 3D image data sets of different medical imaging apparatuses is automated and accelerated by the invention. In addition to this, the advantages of greyscale value-based and model-based segmentation algorithms for the user are combined, and the respective disadvantages are eliminated.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for automatic or semi-automatic segmentation of a 3D image data set, comprising:
providing a computerized processor with a 3D image data set, acquired with a medical imaging apparatus, representing an examination region of an examination subject, said examination region comprising an anatomical organ;
providing information to said computerized processor designating a type of said organ in said examination region;
in said computerized processor, using the designated type of said organ to obtain a model-based segmentation algorithm wherein the designated type of said organ is a basis of the model in the model-based segmentation algorithm;
in said computerized processor, automatically segmenting the 3D image data set by executing said model-based segmentation algorithm based on said designated type of said organ, to produce a segmentation result;
after executing said model-based segmentation algorithm, automatically or semi-automatically segmenting said 3D image data set in said computerized processor by executing a greyscale value-based segmentation algorithm that uses said segmentation result produced by said model, to produce another segmentation result; and
at a display screen in communication with said computerized processor, visually displaying at least one of said segmentation results.

2. A method as claimed in claim 1 comprising comparing the segmentation result obtained by said segmentation with said model-based segmentation algorithm with said segmentation result obtained with said greyscale value-based segmentation algorithm, to obtain a comparison result, and displaying said comparison result at said display screen.

3. A method as claimed in claim 1 comprising providing said computerized processor with a manually-entered input that designates which of said model-based segmentation algorithm and said greyscale value-based segmentation algorithm should be implemented in said computerized processor, and implementing the model-based segmentation algorithm and the greyscale value-based segmentation algorithm in said computerized processor in a sequence as designated by said input.

4. A method as claimed in claim 1 comprising implementing said greyscale value-based segmentation algorithm semi-automatically in said computerized processor dependent on a manual input entered into said computerized processor that designates image points associated with at least a portion of said organ.

5. A method as claimed in claim 1 comprising executing said greyscale value-based segmentation algorithm automatically in said computerized processor.

6. A method as claimed in claim 5 comprising using at least one image point in said segmentation result of said model-based segmentation algorithm as being associated with at least a portion of said organ in executing said greyscale value-based segmentation algorithm.

7. A method as claimed in claim 1 comprising, after obtaining said segmentation result and said another segmentation result by respectively executing said model-based segmentation algorithm and said greyscale value-based segmentation algorithm, manually entering an input into said computerized processor that associates at least one image point with at least a portion of said organ and, in said computerized, automatically correcting said another segmentation result dependent on said input.

8. A method as claimed in claim 1 comprising providing said computerized processor with said 3D image data set as a 3D image data set selected from the group consisting of a magnetic resonance data set, a computed tomography data set, and an angiography data set.

9. A method as claimed in claim 1 comprising providing said computerized processor with a 3D cardiac image data set as said 3D image data set, and designating the left atrium of the heart of the examination subject as said type of said organ.

10. An apparatus for automatic or semi-automatic segmentation of a 3D image data set, comprising:
- a computerized processor provided with a 3D image data set, acquired with a medical imaging apparatus, representing an examination region of an examination subject, said examination region comprising an anatomical organ;
- said computerized processor being provided with information designating a type of said organ in said examination region;
- said computerized processor being configured to use the designated type of said organ to obtain a model-based segmentation algorithm wherein the designated type of said organ is a basis of the model in the model-based segmentation algorithm;
- said computerized processor being configured to automatically segment the 3D image data set by executing said model-based segmentation algorithm based on said designated type of said organ, to produce a segmentation result;
- said computerized processor being configured to automatically or semi-automatically segment said 3D image data set after executing said model-based segmentation algorithm, by executing a greyscale value-based segmentation algorithm that uses said segmentation result produced by said model, to produce another segmentation result; and
- a display screen in communication with said computerized processor, said computerized processor being configured to visually display at least one of said segmentation results.

11. A medical imaging apparatus comprising:
- a data acquisition device configured to obtain a 3D image data set representing an examination region of an examination subject with which the data acquisition device interacts, said 3D image data set including a representation of an anatomical organ in said examination region;
- a computerized processor provided with a 3D image data set, acquired with a medical imaging apparatus, representing an examination region of an examination subject, said examination region comprising an anatomical organ;
- said computerized processor being provided with information designating a type of said organ in said examination region;
- said computerized processor being configured to use the designated type of said organ to obtain a model-based segmentation algorithm wherein the designated type of said organ is a basis of the model in the model-based segmentation algorithm;
- said computerized processor being configured to automatically segment the 3D image data set by executing said model-based segmentation algorithm based on said designated type of said organ, to produce a segmentation result;
- said computerized processor being configured to automatically or semi-automatically segment said 3D image data set after executing said model-based segmentation algorithm, by executing a greyscale value-based segmentation algorithm that uses said segmentation result produced by said model, to produce another segmentation result; and
- a display screen in communication with said computerized processor, said computerized processor being configured to visually display at least one of said segmentation results.

* * * * *